(12) United States Patent
Field

(10) Patent No.: US 10,414,077 B2
(45) Date of Patent: Sep. 17, 2019

(54) PLASTIC BOTTLE

(71) Applicant: FIELD MANUFACTURING CORP., Torrance, CA (US)

(72) Inventor: Patrick Frank Field, Hermosa Beach, CA (US)

(73) Assignee: FIELD MANUFACTURING CORP., Torrance, CA (US)

( * ) Notice: Subject to any disclaimer, the term of this patent is extended or adjusted under 35 U.S.C. 154(b) by 605 days.

(21) Appl. No.: 14/222,831

(22) Filed: Mar. 24, 2014

(65) Prior Publication Data

US 2014/0225309 A1   Aug. 14, 2014

Related U.S. Application Data

(63) Continuation of application No. 11/748,740, filed on May 15, 2007, now abandoned.

(60) Provisional application No. 60/800,753, filed on May 16, 2006, provisional application No. 60/800,754, filed on May 16, 2006.

(51) Int. Cl.
*B29C 45/00* (2006.01)
*B65D 1/02* (2006.01)

(52) U.S. Cl.
CPC .......... *B29C 45/0055* (2013.01); *B65D 1/023* (2013.01); *B65D 1/0276* (2013.01); *B65D 1/0284* (2013.01); *B65D 2501/0036* (2013.01)

(58) Field of Classification Search
None
See application file for complete search history.

(56) References Cited

U.S. PATENT DOCUMENTS 4,007,851 A * 2/1977 Walker ................ B65D 41/348
                                                          215/307
4,969,563 A * 11/1990 Strassheimer ...... B29C 49/0078
                                                          215/373

* cited by examiner

*Primary Examiner* — Monica A Huson
(74) *Attorney, Agent, or Firm* — Fay Sharpe LLP

(57) ABSTRACT

Disclosed is a bottle for containing a beverage which has plastic body. The bottle includes a bottom surface having a non-sliding element located to be in contact with a surface when the bottle is in the upright position. In addition or alternately, the bottle includes a neck portion which has at least two spaced apart circumferential ribs. Preferably, each of the ribs is disposed normal to a vertical axis of the bottle in its upright position. In another embodiment of the invention, the ribs are continuous along the exterior of the neck.

20 Claims, 3 Drawing Sheets

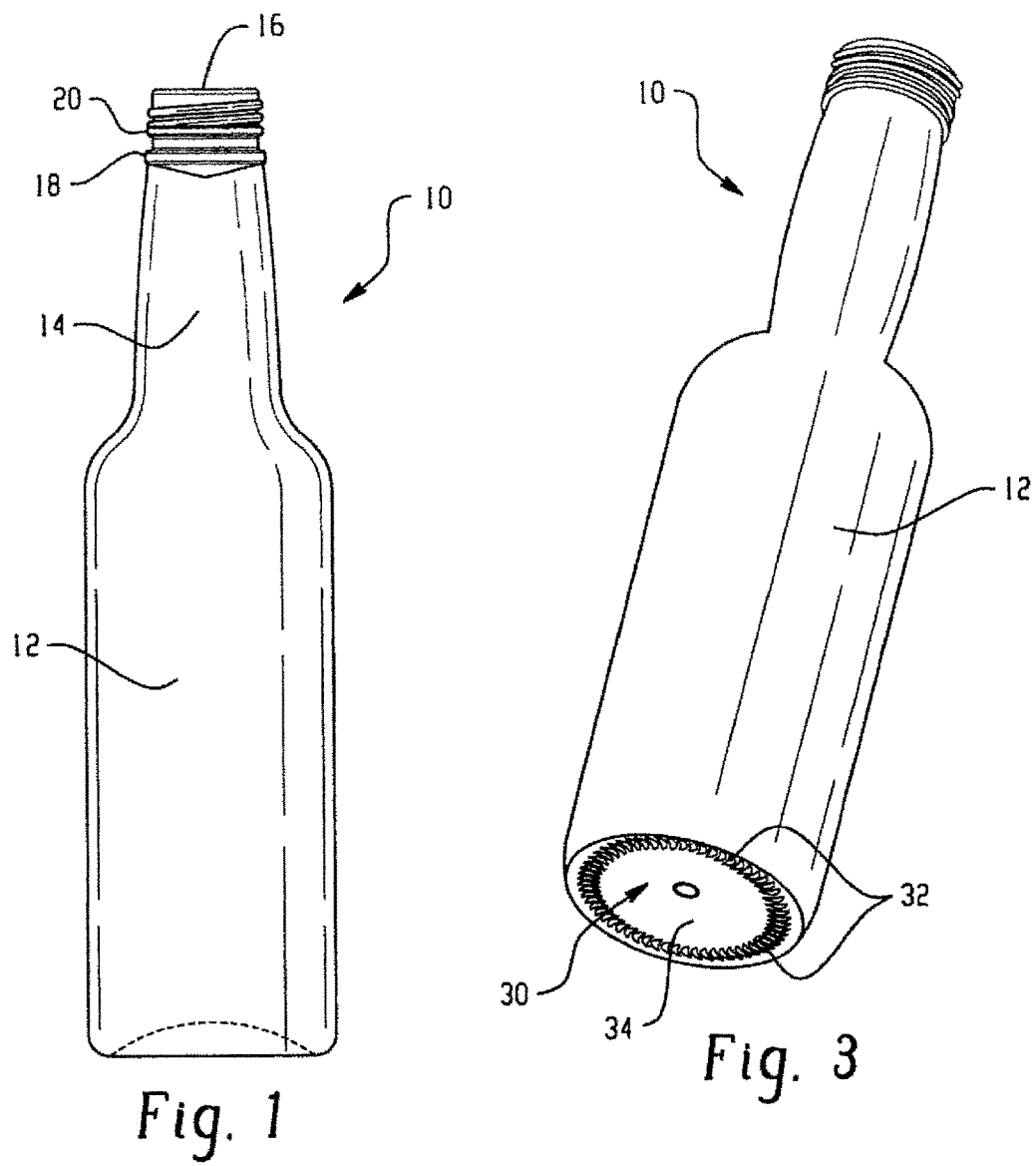
Fig. 1
Fig. 3
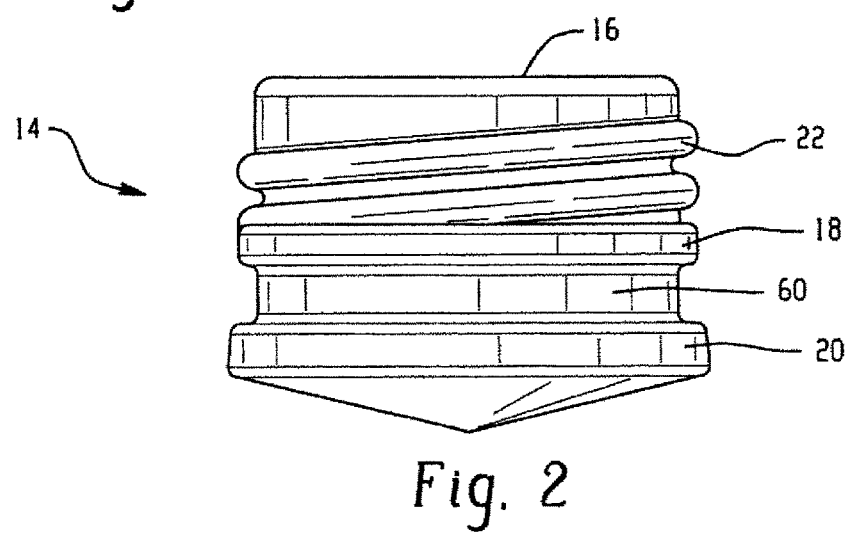
Fig. 2

PLASTIC BOTTLE

The present application claims priority to, and the benefit of the filing date of, U.S. application Ser. No. 14/748,740, filed May 15, 2007, which claims priority to U.S. Provisional patent application Ser. Nos. 60/800,753 and 60/800,754, both filed on May 16, 2006.

BACKGROUND

The present exemplary embodiments relate to bottle elements, including securing a bottle cap to a bottle and inhibiting the sliding of a beverage container when the container is in its upright position. It finds particular application in conjunction with plastic bottles for containing beverages, such as soft drinks, milk, beer, or wine, and will be described with particular reference thereto. However, it is to be appreciated that the present exemplary embodiment is also amenable to other like applications.

Historically bottles used to serve beverages were glass and the bottles were capped with a metallic bottle cap, having a rubber seal, which was crimped over a lip of a neck portion of the glass bottle to hermetically seal the bottle. More recently, beverage bottles have been made out of plastic instead of glass and typically the plastic bottle was not robust enough to endure the above capping process. In response to the lack of robustness of the plastic bottles, an alternative capping technology was developed. The plastic bottle was hermetically capped with a plastic capping assembly which included an exterior support ring secured to a lip of the neck portion of the plastic bottle. The support ring is designed to slide over the lip during the initial sealing of the bottle and to become disassociated from the cap when a person opened the bottle.

In addition to the capping issue, given the low coefficient of friction of typical plastic material, a bottle made of plastic in its upright position may have a tendency to slide. Prior attempts to address the sliding issue have included molding feet into the bottom surface of the bottle.

BRIEF DESCRIPTION

An embodiment of the present invention includes a bottle comprising a plastic body. The bottle includes a bottom surface having a non-sliding element located to be in contact with a surface when the bottle is in the upright position.

A second embodiment of the present invention includes a bottle comprising a plastic body. The plastic bottle has a neck portion which includes at least two spaced apart circumferential ribs. The ribs are aligned parallel to each other and each of the ribs is disposed normal to a vertical axis of the bottle in the upright position.

Another embodiment of the present invention includes a bottle comprising a plastic body. The body includes a neck portion having at least two spaced apart continuous circumferential ribs parallel to each other.

A further embodiment of the invention is a capped bottle. The capped bottle has a plastic body which includes a neck portion. The neck portion includes a threaded segment for receiving a bottle cap. The bottle cap is attached to the bottle without the use of an exterior support ring.

An additional embodiment of the invention is a bottle preform comprising a plastic body. The plastic body has a neck portion. The neck portion includes at least two spaced apart circumferential ribs parallel to each other and each ribs is disposed normal to a vertical axis of the preform in the upright position.

BRIEF DESCRIPTION OF THE DRAWINGS

FIG. 1 is front view of a plastic bottle which includes the present invention;

FIG. 2 is an enlarged view of a segment of the neck portion of the bottle;

FIG. 3 is a perspective view of the bottle;

DETAILED DESCRIPTION

Figure 4:
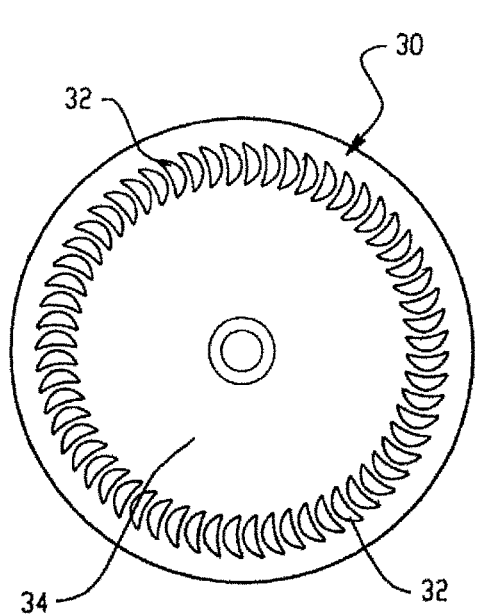
FIG. 4 is a bottom view of the bottle.

With reference to FIG. 1, a front view of bottle 10 is shown. In a particular embodiment, bottle 10 is made of plastic. The invention is not limited by the type of plastic used to construct plastic bottle 10. Any type of suitable plastic for use as a beverage container is acceptable. Examples of suitable types of plastic include, but are not limited to, polyethylene terephthalate ("PET"), polystyrene, such as, high impact polystyrene, or transparent impact polystyrene, polyethylene, polypropylene, and combinations thereof. Likewise, any size bottle for holding a beverage is amenable to the present invention. Exemplary sizes of bottle 10 include but are not limited to, e.g., 187 ml, 375 ml, 750 ml, 1.5 l, and 3 l.

As depicted in FIG. 1, bottle 10 includes a main body 12. Main body 12 includes a neck portion 14 at a top portion of body 12 when bottle 10 is in its upright position, as shown. Bottle 10 further includes an opening 16 for pouring a beverage into or from bottle 10 located at the top of neck 14. As shown, Bottle 10 further includes at least two spaced apart circumferential ribs 18, 20 aligned substantially parallel to each other. Each of ribs 18 and 20 may be disposed normal to a vertical axis of bottle 10 when bottle 10 is in its upright position. As can be seen more clearly in FIG. 2, a recess 60 is formed between ribs 18 and 20 forming a concave support ledge for a cap for the bottle. In one particular embodiment of bottle 10, the concave support ledge is about 3 to 3.5 mm wide and about 1 to 1.5 mm deep. Alternatively, bottle 10 may have more than two ribs.

In one particular embodiment, ribs 18 and 20 may be continuous. Continuous is used herein to denote that the each rib extends completely around the circumference of bottle 10, without the rib having distinct end points. In an alternate embodiment, ribs 18 and/or 20 may be non-continuous.

With reference to FIG. 2, bottle 10 may include one or more threads 22. Typically threads 22 are designed to engage the interior of a threaded bottle cap (not shown) to hermetically seal bottle 10. As illustrated, threads 22 may extend down the neck of the bottle such that they come into contact with rib 18, or they may end further up the neck of the bottle such that there is a gap between the top rib 18 and the bottom of the threads. Also threads 22 may be continuous or non-continuous.

In one particular embodiment, it is preferred that ribs 18 and 20 extend away from neck 14 of bottle 10 an equal distance as does threads 22. In a particular embodiment, threads 22 and ribs 18 and 20 extend away from neck 14 approximately 1 mm. In a further embodiment, threads 22 and ribs 18, and 20 extend up to about 1.5 mm from neck 14. In other embodiments, theses distances may be greater or less than those above. In one embodiment, the ribs 18 and 20 extend away from the neck of the bottle an equal distance. In a still further embodiment, the ribs 18 and 20 may extend away from the neck different distances.

As depicted in FIGS. 3 and 4, bottle 10 also includes a bottom surface 30. As shown, bottom surface 30 may include a knurled base finish. In the illustrated embodiment, the knurled base finish includes a plurality of ridges 32. Preferably, ridges 32 are located along a portion of base 30 which comes in contact with a surface below bottle 10 when bottle 10 is in its upright position. For example, if bottle 10 is placed upright on a table, ridges 32 of bottom surface 30 will be in contact with the table. Base 30 further includes a recessed section 34 radially inward from ridges 32. This recessed section preferably will not contact a flat surface that the bottle is placed on when in an upright position.

Figure 5:
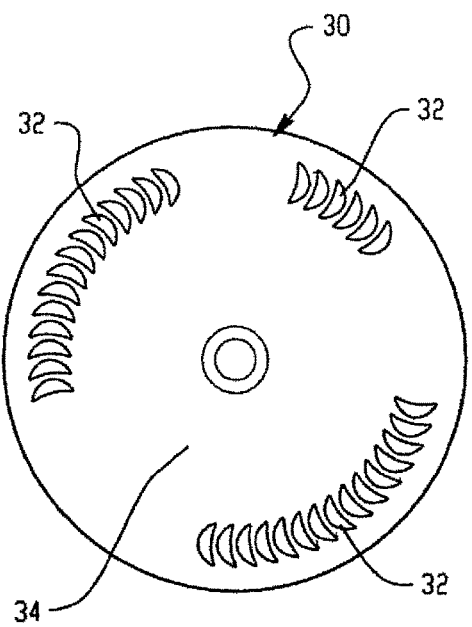
FIG. 5 is a view of a bottom surface of the bottle with non-continuous ridges.
Figure 6:
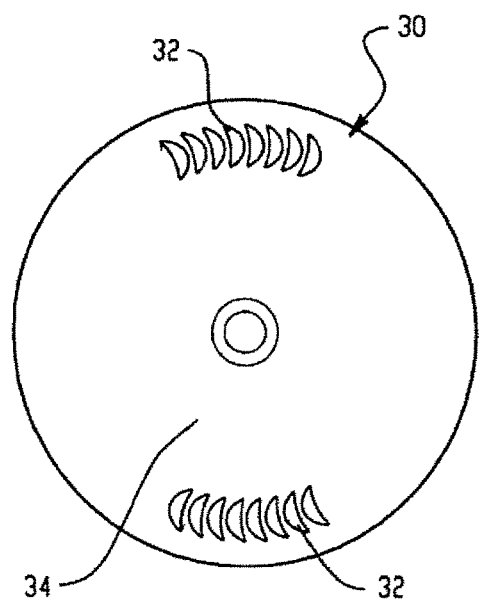
FIG. 6 is a view of a bottom surface of the bottle with groupings of the ridges about 180° apart.
Figure 7:
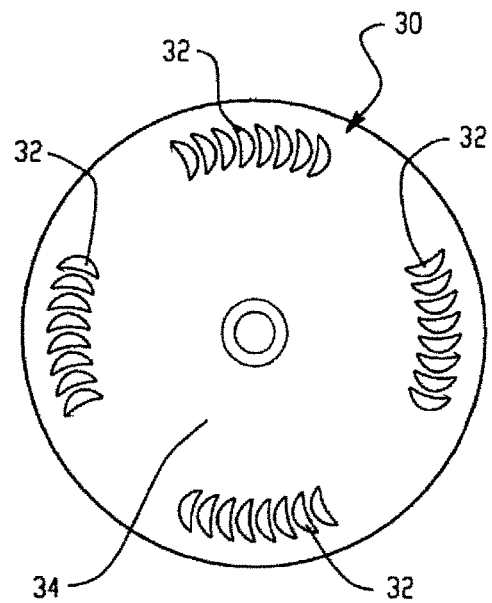
FIG. 7 is a view of a bottom surface of the bottle with groupings of the ridges about 90° apart.

Various orientations of ridges 32 may be used to practice the invention. As shown in FIG. 4, ridges 32 may be disposed in a 360 degrees pattern around base 30. As noted above regarding ribs 18 and 20, the pattern shown in FIG. 4 of ridges 32 would be considered continuous. Alternatively, ridges 32 may be located in any pattern along base 30. As shown in FIG. 5, ridges 32 may be located in a non-continuous pattern. As illustrated in FIG. 6, respective groupings of ridges 32 may be located about 180 degrees away from each other on base 30. Furthermore as shown in FIG. 7, ridges 32 may be in four (4) separate groupings wherein each grouping is at about 90 degrees apart from the adjacent groupings. The aforementioned numerical relationships of 180 degrees and 90 degrees is used herein in a general sense to describe FIGS. 6 and 7 is not meant to be limited to the precise numbers used to describe the spacing of the respective groupings of ridges 32. Any amount of equal or unequal spacing between the grouping is contemplated.

Also ridges 32 are not limited to any particular size, shape or number of ridges along base 30. It is just preferred that ridges 32 are present on base 30 in suitable quantity, size, shape, and distribution to inhibit bottle 10 from sliding on a surface on which it rests when it is in an upright position. Additionally the invention is not limited by the spacing between individual ridges 32. The spacing may be uniform (all ridges 32 are equally spaced apart) or random (all ridges 32 are not equally spaced apart).

One particular embodiment of ridges 32 includes sufficient amount, sized, shaped, and aligned ridges 32 to inhibit bottle 10 from sliding during the filing of bottle 10 prior to capping.

The knurled base finish is not limited to ridges 32; the base finish may be any design which will inhibit the ability of bottle 10 to slide. The present invention may be practiced by incorporating any type of non-sliding element into a location of bottom surface 30 that will come in contact with a surface below bottle 10 when bottle 10 is in the upright position. One preferred example of a non-sliding element is something that incorporates a textured surface into bottom surface 30 at the aforementioned location. For example instead of ridges 32, the textured surface may be formed by a dimpled pattern. The pattern may be uniform or random.

Figure 8:
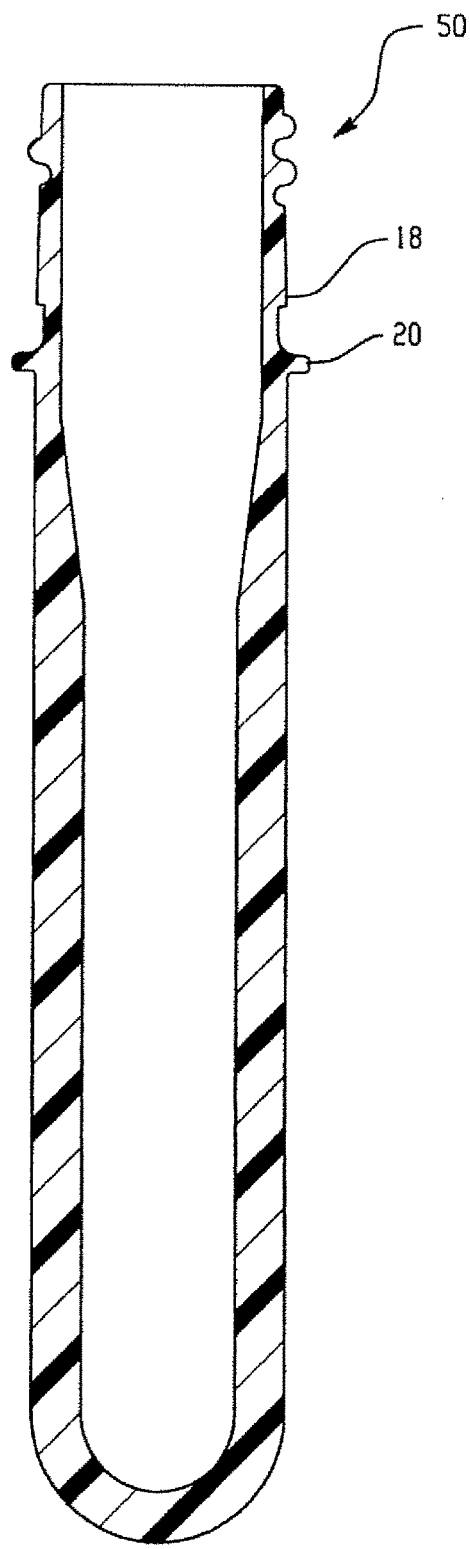
FIG. 8 is a front view of a preform which includes the present invention.

An additional embodiment of the invention may include a bottle preform, as illustrated in FIG. 8. Preform 50 may include the pair of ribs 18 and 20 along with threads 22. Preform 50 may be stretch molded into bottle 10. Preferably, the stretch molding process may be used to form ridges 32 into bottle 10.

One exemplary process for making bottle 10 includes the step of forming preform 50. In one particular embodiment, preform 50 is formed by injection molding. It is preferred, that during the injection molding step, ribs 18 and 20 are formed onto preform 50. Next, perform 50 may be stretch molded into bottle 10. In one particular embodiment, preform 50 is inserted into a mold cavity. Hot air is injected into perform 50 causing perform 50 to expand and to take on the internal shape of the mold cavity. Preferably the mold cavity includes the mirror image of the above described knurled base finish.

The pair of ribs 18 and 20 in preform 50 and bottle 10 creates a concave support ledge that acts as a handling mechanism for the preform and bottle during production. The handling equipment can then grab the preform and bottle in between ribs 18 and 20 where rib 18 acts as a ledge and rib 20 as the support for the handling equipment. This is different than previous designs of handling mechanisms that are currently being used where the support ring consists of one external rib that is much larger in diameter to solely act as a support ledge for the handling equipment.

The length of many metal and plastic closures when capped on wine and other beverage bottles can sometimes extend further down the bottle neck beyond the position of existing support rings on the bottles. These types of closures are known as long-skirt capsules. The larger diameter of existing support rings inhibits these closures to be capped properly. The smaller diameter of ribs 18 and 20 that make up the concave support ledge of this invention enables these closures to now be properly capped.

Figure 9:
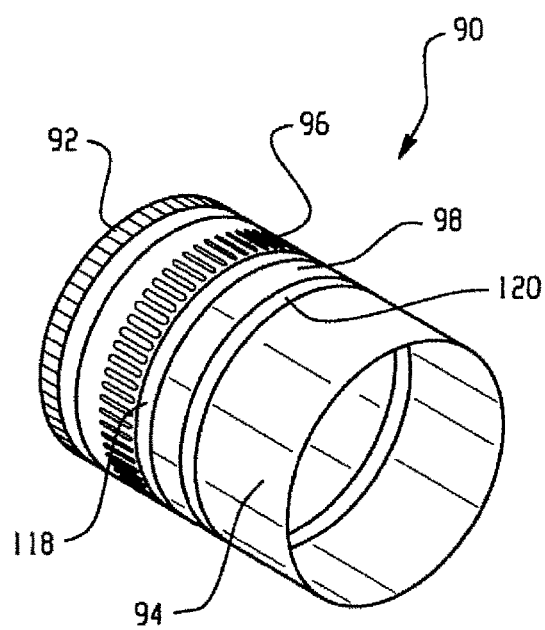
FIG. 9 is a perspective view of a skirted capsule.

The present invention may be used to hermetically seal bottle 10 without the use of an exterior support ring. Advantageously bottle 10 may be capped with a skirted capsule. A skirted capsule 90 is illustrated in FIG. 9. Capsule 90 includes a metallic threaded bottle cap portion 92 for engaging the threads 22 on bottle 10. Capsule 90 further includes a skirt 94 extending from cap portion 92. One particular type of material which may be used for skirt 94 is rolled aluminum. There is a perforated section 96 in between cap portion 92 and skirt 94. The concave support ledge of bottle 10 would align with segment 98 of skirt 94. Additionally, ribs 18 and 20 would be aligned with segments 118 and 120 of skirt 94. With respect to neck 14, skirted capsule 90 may extend from about one-half to about two-thirds of the way down neck portion 14 starting at opening 16.

The invention may further include bottle 10 filled with a beverage, such as any one of wine, beer, milk, liquor, or soda. The filled bottle 10 may be capped with a skirted capsule or not. Preferably filled bottle 10 includes at least one of ribs 18 and 20 or the knurled base finish as described above, more preferably both.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A method for the manufacture of a plastic bottle comprising the step of forming a preform by injection molding, forming at least two ribs in a neck portion of the plastic bottle preform during the injection molding step, stretch molding the perform into a bottle, wherein handling equipment grabs a concave support ledge formed on said preform between the pair of ribs during production, a first rib forming a ledge and a second rib forming a support for the handling equipment, filling said bottle, and applying a closure having a length extending past the pair of ribs.

2. The method of claim 1 wherein each rib is continuous.

3. The method of claim 1, wherein at least one of the ribs is non-continuous.

4. The method of claim 1, wherein the neck portion further comprises a plurality of exterior threads, the threads positioned between the ribs and an opening of the bottle.

5. The method of claim 1, wherein said ribs extend an equal distance away from said neck portion.

6. The method of claim 1, wherein the mold cavity includes a knurled base finish.

7. The method of claim 1 wherein each of said ribs is disposed substantially normal to a vertical axis of the bottle in an upright position.

8. The method of claim 1, wherein said ribs extend different distances away from said neck portion.

9. The method of claim 4, wherein said closure comprises a skirted capsule.

10. The method of claim 9, wherein said closure is metal.

11. The method of claim 10, wherein each rib of said pair of ribs extends substantially an equal distance from the neck portion of the bottle.

12. The method of claim 11, wherein said threads and said pair of ribs extend substantially an equal distance from the neck portion of the bottle.

13. The method of claim 4, wherein said threads come into contact with one rib of said pair of ribs.

14. The method of claim 11, wherein each of said ribs and said threads extend between 1 and 1.5 mm from said neck portion.

15. The method of claim 1, wherein said bottle is formed to include ridges on a base which inhibit sliding of the bottle during a filing of the bottle.

16. The method of claim 9, wherein said capsule includes a perforated section between a cap section and a skirt section.

17. The method of claim 9, wherein after installation the capsule includes a distinct segment aligned with said concave support ledge.

18. The method of claim 9, wherein after installation the capsule includes distinct segments aligned with each of said ribs.

19. A method for the manufacture of a plastic bottle comprising the step of forming a preform by injection molding, forming at least two ribs and a thread in a neck portion of the plastic bottle preform during the injection molding step, said ribs and thread extending a distance at least substantially equal from said neck portion, stretch molding the perform into a bottle, filling said bottle, and applying a metal closure having a length extending past the pair of ribs, said closure including a removable cap portion.

20. The method of claim 19, wherein said closure is comprised of aluminum.

* * * * *